United States Patent Office 3,562,304
Patented Feb. 9, 1971

3,562,304
ABLATIVE COMPOSITION OF MATTER
Jerry Tucker, Waco, Tex., assignor to North
American Rockwell Corporation
No Drawing. Filed Feb. 13, 1968, Ser. No. 705,030
Int. Cl. C08c *11/16*
U.S. Cl. 260—41.5                                          9 Claims

ABSTRACT OF THE DISCLOSURE

A thermal insulating ablative composition comprising an ethylene propylene terpolymer, a reactive terminated polybutadiene polymer, asbestos, a curing agent, and other optional flame retardants.

---

The present invention pertains to a novel ablative thermal insulating composition of matter. More particularly, this invention relates to an insulating composition comprising an elastomeric polymer, a telechelic polymer, a curing agent and asbestos; and it may also contain at least one flame retardant wherein said reagents are homogeneously and intimately blended to produce the insulating composition.

The need for improved ablative insulating compositions of matter to protect diverse and exposed aero surfaces, rocket case walls, sensitive instruments, rocket motor thrust chambers and the like against extreme temperatures changes, especially heat, has become a prime requirement. In order to effect the proper function and to maintain the integrity of the above listed components, some kind of protection must be employed to essentially nullify the undesirable effects of elevated temperatures from intimately contacting the surface or instrument needing protection. The prior art attempts to give some protection generally consist of refrigeration or the use of phenolic and ceramics. However, these attempts have not been too successful for many reasons. For example, refrigeration processes are expensive, cumbersome and not really adaptable to wide applications. Phenolic insulating compositions frequently exhibit poor interface surface adherence and they often require extensive, meticulous post cures, and the reliability of these post cures is often in question. Ceramic insulating compositions are generally heavy and thick, exhibit poor adherence to the coated surfaces and tend to crack under heat stress and thereby expose certain areas of the surface to heat.

In view of the foregoing discussion, it will be readily appreciated by those skilled in the subject art that a critical need exists for acceptable and workable insulating compositions. Accordingly, it is an object of this invention to provide a novel ablative thermal insulating composition of matter. It is another object of the invention to provide a new ablative thermal insulation material having adhesion, elasticity, flexibility, relative lightness and insulating characteristics. Still a further object of the invention is to provide a composition comprising an elastomeric polymer, a telechelic polymer, asbestos, and other optional flame retardants wherein the immediate reagents are homogeneously and intimately dispersed in said composition to coact and thereby produce an ablative composition. Still other objects and features of the invention will be self-evident to those versed in the art in the light of the instant disclosure and accompanying claims.

The above and other objects of the invention are accomplished by formulating a novel ablative composition of matter comprising an elastomeric ethylene propylene terpolymer, a carboxy terminated polybutadiene polymer, asbestos, a curing agent and optionally containing a flame retardant chlorinated hydrocarbon and the flame retardant antimony oxide.

The elastomers suitable for the purpose of the invention are the terpolymers of ethylene and propylene. The commercially available ethylene propylene terpolymers of the kind used herein can be prepared by using a Ziegler-Natta type catalytic system. Terpolymers of ethylene and propylene with a ratio of three to one are usually with a few percent of unsaturated non-conjugated diene units. Exemplary of one commercially available terpolymer employed within the spirit of the invention is the terpolymer of ethylene and propylene sold under the registered trademark Nordel® and manufactured by the E. I. du Pont de Nemours and Company. This terpolymer is amber to light gray in appearance, it has a specific gravity of 0.85, a Mooney viscosity at 250° F. and 40 and it is soluble in benzene, hexane, cyclohexane, tetrachloroethylene and carbon tetrachloride. Illustrative of another ethylene propylene terpolymer suitable for and propylene, commercially available under the trademark Enjay®, as purchased from the Enjay Chemical Company. This latter terpolymer, EPT, has a Mooney viscosity at 260° F. of 63, a specific gravity of 0.86, consisting of about 55 percent ethylene, a light amber color and no odor.

Generally, the telechelic type polymer suitable for the purpose of the present invention is reactive terminated polybutadiene. This type of telechelic polymer and the method of preparation is well known in the art and is described in the Journal of Polymer Science, vol. XLVI, Issue 149, pp. 535–539, (1960), and in United States Pat. No. 3,305,523. The carboxyl-terminated polybutadiene employed herein is the polybutadiene polymer of the structural formula R—$(CH_2$—$CH$=$CH$—$CH_2)_n$—′R wherein the terminal functional group R is a carboxyl, hydroxyl, amine, mercapto or isocynate radical and wherein $n$ equals about 100 to 130. An example of the carboxy-terminated polybutadiene polymer employed herein is the polymer available under the trademark Butarez® CTL manufactured by the Phillips Petroleum Company. The average molecular weight for this latter polymer is about 6,000 to 7,000, $n$ equals about 110 to 130, it has an acid number in the range of about 16 to 17, and it contains an average of about 2 carboxyl groups per molecule. The concentration of the elastomeric and the telechelic polymer used for the fabrication of the novel composition of matter is usually about 10 to 20 parts of elastomer for each 1 to 5 parts of telechelic polymer. Usually, a concentration of about 80 to 100 parts per hundred of elastomer and a concentration of about 5 to 20 parts per hundred of telechelic are used for each 100 parts of total elastomer polymeric material.

The asbestos utilized in the preparation of the novel compositions generally is of the varieties termolite, crocidolite, picrolite, chrysolite and the like. The asbestos employed herein is in fibrous form and it consists of tiny fibers capable of passing through sieves with a mesh size of from U.S. No. 3 to 35. The asbestos fibers were dried for about 4 hours at 340°±10° F. before using in the composition, and, the amount of asbestos employed is from about 75 phr. to about 150 phr. Illustrative of an asbestos used is the commercially available asbestos Plastibest® 20, manufactured by the Johns Manville Company.

The flame retardants formulated into the ablative composition are the chemical compound perchloropentacyclodecane, $C_{10}Cl_{12}$, sold under the registered trademark Dichlorane®. The preparation of perchloropentacyclodecane is set forth in U.S. Pat. 2,996,553. Another flame retardant formulated into the ablative composition is an inorganic or organic component of antimony. Illustrative of antimony compounds are antimony trioxide, sodium antimonite, potassium antimonite, antimony valerate, antimony caprate and the like. Generally, the ratio of the perchloropentacyclodecane to the antimony salt will be about 2 to 1; that is, about 30 to 50 parts per hundred of perchloropentacyclodecane to 10 to 30 parts per hundred of the antimony compound.

The functional curing agents used in this invention are often added in minor amounts to cure the polymers in the performance of the process of this invention. Nonlimiting examples of curing catalysts used for this purpose are tristrimethylsilyl borate, benzoyl peroxide, dicumyl peroxide, acetyl peroxide, lauroyl peroxide and other catalysts well known in the curing of elastomers or telechelic polymers. The curing catalysts are added in amounts of from 1 to about 10 parts per hundred based on the total weight of the combined polymers. The particular catalysts and the amount employed depend on the state of cure desired and the nature of the polymeric material employed in the composition. Generally, the homogenous uncured blend can be cured by heating to about 300° to 350° F. for 20–40 minutes at a pressure range of about 0.1 to 0.5 ton per inch square to effect a cured product.

The components of the composition of this invention are thoroughly mixed together in a suitable mixer, such as a Banbury mixer or on a rubber mill. The polymeric materials, without the curative, are first milled prior to adding the curative; then, the fire retardants and asbestos are completely incorporated into the milling polymeric mixture. The entire milling procedure usually takes about 30 minutes to 60 minutes. It is desirable to circulate cooling water through the jacket during the milling or mixing cycle to maintain the temperature in the region of 200° F. to 250° F. After the final compound has been prepared, it can easily be sheeted to the desired dimensions by the use of a roll mill, a 3 or 4 rod calendar mill, or extruded into tubular shapes with a screw extruder and the like.

The above ingredients and methods are merely illustrative of the spirit of the invention, and it is to be understood that they are not intended to limit the disclosure, as other techniques may be successfully employed by those skilled in the art in the light of the present teachings. The following examples are illustrative of the invention and they are not to be considered as limiting the scope of the invention.

EXAMPLE I

A novel ablative insulating composition was prepared as follows: To 100 phr. of ethylene propylene terpolymer was added 100 phr. of asbestos and 10 phr. of carboxy terminated polybutadiene and the three ingredients were milled on a conventional roll mill for about 45 minutes. Next, 7.5 phr. of the curing agent 2,5-dimethyl-2,5-di(t-butyl peroxy)hexane, available under the registered trademark Varox®, Vanderbilt Company, was added and the milling was continued for about 5 minutes to completely incorporate the curing agent into the composition. Finally, 20 phr. of antimony trioxide and 40 phr. of perchloropentacyclodecane was added to the just milled composition and the milling was continued for about 10 minutes to completely incorporate these reagents into the mixture to produce the desired homogeneous composition. The temperature during the entire milling process was maintained at about 225° F. by circulating cooling water through the milling rolls. The milled product was removed in sheet form, cut into predetermined designs and heated to about 340° F., for 30 minutes, at a pressure of about 0.2 to per square inch to produce the final, cure, cross-linked insulating composition. The cured composition had a density of 0.0508 pound per cubic inch and a Barcol hardness of 32 to 42.

EXAMPLE II

A cured sheet of the insulating composition of Example I was post cured for 10 hours at 250° F. and the post cured composition exhibited an elongation of 36 percent, a tensile strength of 140 p.s.i., modulus of 827 p.s.i. a Shore "A" hardness of 77. A tab of the post cured sheet measuring 2x2x0.2 inches was mounted in the motor skirt of a 6 inch subscale rocket motor for testing its char performance in a 5800° F. combustion gas mass flux rate wherein the rates ranged from 0.287 to 1.97 pounds per inch square per second. The char rate for the insulating tab was 11 mils per second at 0.287 and 30 mils per second at 1.97, indicating unobvious heat erosion resistance for the insulating composition.

EXAMPLE III

To 100 phr. of ethylene propylene terpolymer was added 100 phr. of dried long fiber asbestos and 10 phr. of liquid carboxy-terminated polybutadiene and the ingredients were homogeneously dispersed into a blended composition of matter. Next, 7.5 phr. of peroxide curing agent was added to the mixture and the milling was continued for about 5 minutes to completely and homogeneously blend the peroxide into the composition. Finally, the milled product was removed from the mill in sheet form and heated at 340° F. for 30 minutes at 0.2 ton of pressure to give the cured, cross-linked insulating composition. The cured product exhibited a density of 0.0460 pound per cubic inch and a Barcol hardness of 38–45.

EXAMPLE IV

A cured sheet of the insulating composition of Example II was post cured for 10 hours at 250° F. and this post cured composition had an elongation of 31 percent, a tensile strength of 137 p.s.i., a modulus of 865 p.s.i. and a Shore "A" hardness of 79. Next, a tab of the post cured ablative measuring about 2 x 2 x 0.2 inches was mounted in the motor skirt of a 6 inch subscale rocket motor for testing its erosion resistance in a hot environment. The testing was performed by firing the rocket while anchored to a stand. The rocket motor was ignited by electrically actuating an igniter of a conventional propellant composition placed in the firing chamber. The composition was composed of a mixture of ammonium perchlorate and a powdered metal such as aluminum, iron, magnesium, etc. The motor was fired for about 4 seconds at 5800° F. and it produced a mass flux in pounds per square inch per second over the range of 0.287 to 0.526. The char rate for the tab at 0.287 was 7 mils per second, at 0.371 it was 9 mils per second, and, at 0.526 it was 14 mils per second. A prior art phenolic asbestos based composition tested under these conditions had a char rate of 13, 15 and 20 mils per second which seemingly indicates unobvious heat resistance and a decreased erosion for the inventive composition.

EXAMPLE V

To 45.98 grams of ethylene propylene terpolymer, Nordel 1040, masticated on a roll mill for 5 minutes was added 4.60 grams of carboxy-terminated polybutadiene telechelic polymers Butarez CTL II, and the milling continued to thoroughhly mix the terpolymer and the telechelic polymer. Next, 45.98 grams of asbestos, Plastibest 20, was slowly added to the polymeric blend and the milling continued for about 30–40 minutes. Finally, 3.44 grams of the 2,5 - dimethyl - 2,5 - di(t-butyl peroxy)hexane curing agent, Varox, was blended into the composition to produce 100 grams of an ablative composition of matter. The composition was removed from the roll mill in sheets 0.2 inch thick and cured at 300° F. to 340° F. for one-half hour. The cured composition had a density of 0.0460 pound per inch cubic, a linear thermal expansion parallel to the longitudinal grain of $1.6 \times 10^{-5}$ in./in./° F.; a linear thermal expansion transverse to the grain of $0.8 \times 10^{-5}$ in./in./° F. and a linear thermal expansion in the laminar direction of $27.0 \times 10^{-5}$ in./in./° F. The cured sample also had a tensile strength paralled to the grain of 2217 p.s.i., a tensile strength perpendicular to the grain of 1225 p.s.i., an elongation parallel to the grain of 24 percent and an elongation perpendicular to the grain of 71 percent. The sample was post cured at 250° F. and 10 hours and tested according to the procedure set forth in Example IV supra. The tested sample had char insulation rate in mils per second of 7, 6, 9, 14, 15, 25, 26 and 24 inches, respectively, mass flux area expressed in pounds per inch square per second of 0.287, 0.295, 0.371, 0.526, 0.617, 1.115, 1.85, and 1.97.

The novel compositions of this invention may be employed for lining the internal surface of combustion chambers and rocket motor skirts. The case liners can be applied in the form of a calendered sheet and cure bonded in place, or the liner may be cure molded then bonded in place. The liner may be bonded to itself or to a metal housing by using conventional epoxies or polybutadiene based adhesives. Although, for ease of illustration, the discussion and examples given above relate to the use of the composition for lining rocket skirts, chambers and the like, the insulating composition can be used for their insulating properties where it is desirable to essentially lessen fire hazard, such as protective insulation for electrical motors in mines, molded insulation on electric conduits and the like.

Although the invention has been described and illustrated in detail, it is to be clearly understood that the same is by way if illustration and example only, and it is not to be taken by way of limitation as other embodiments will be apparent from reading of this invention.

I claim:

1. A novel heat insulating composition of matter wherein the composition consists essentially of an ethylene/propylene/non-conjugated diene terpolymer, a carboxy terminated polybutadiene telechelic polymer, a halogenated hydrocarbon fire retardant wherein said halogenated hydrocarbon fire retardant is perchloropentacyclodecane, an antimony fire retardant, asbestos and a curing agent for said polymeric materials.

2. A insulating composition according to claim 1 wherein said antimony fire retardant is antimony trioxide.

3. An insulating composition according to claim 1 wherein said halogenated hydrocarbon fire retardant is perchloropentacyclodecane.

4. An insulating composition according to claim 1 wherein the composition contains about 80 to 100 parts per hundred of terpolymer and about 5 to 20 parts per hundred of telechelic polymer.

5. An insulating composition according to claim 1 wherein said antimony fire retardant is antimony trioxide and wherein the concentration of said perchloropentacyclodecane to said antimony trioxide is about 2 to 1.

6. An insulating composition according to claim 1 wherein the composition contains about 75 to 150 parts per hundred of asbestos and wherein said asbestos is intimately distributed through the composition.

7. An insulating composition according to claim 1 wherein said curing agent is 2,5-dimethyl-2,5-di(t-butyl peroxy)hexane.

8. An insulating composition according to claim 1 wherein said curing agent is a peroxide.

9. An insulating composition according to claim 1 wherein the composition contains about 100 parts per 100 of ethylene/propylene/non-conjugated diene terpolymer, about 10 parts per 100 of carboxy terminated polybutadiene telechelic polymer, about 40 parts per 100 of perchloropentacyclodecane fire retardant, about 20 parts per 100 of antimony trioxide fire retardant, about 100 parts per 100 of asbestos and about 7.5 parts per 100 of 2,5-dimethyl-2,5-di(t-butyl peroxy)hexane curing agent.

References Cited

UNITED STATES PATENTS

| 2,640,000 | 5/1953 | Seyb et al. | 106—15FP |
| 3,305,523 | 2/1967 | Burnside | 260—46.5 |
| 3,382,204 | 5/1968 | Gouinlock | 260—33.8N |
| 3,427,366 | 2/1969 | Verdol | 260—5 |

FOREIGN PATENTS

| 1,027,023 | 4/1966 | Great Britain. |

OTHER REFERENCES

Chem. Abstract 67: 109, 493X, November, 1967.

MORRIS LIEBMAN, Primary Examiner

T. MORRIS, Assistant Examiner

U.S. Cl. X.R.

260—889